United States Patent
Streander

[11] 3,785,057
[45] Jan. 15, 1974

[54] WORKPIECE EDGE AND CORNER LOCATING TOOL

[75] Inventor: George W. Streander, Alamogordo, N. Mex.

[73] Assignee: Design SYSTEMS, Inc., Alamogordo, N. Mex.

[22] Filed: Oct. 21, 1971

[21] Appl. No.: 191,187

[52] U.S. Cl. .............................. 33/169 R, 33/180 R
[51] Int. Cl. ............................................. G01b 5/25
[58] Field of Search ...................... 33/180 R, 189 R, 33/169 R, 174 S, 42, 43, 41 E

[56] References Cited
OTHER PUBLICATIONS
American Machinist; August 30, 1965, pg. 104.

Primary Examiner—Louis R. Prince
Assistant Examiner—Charles E. Phillips
Attorney—Harvey B. Jacobson

[57] ABSTRACT

A gauge body defining a reference axis and including first, second and third abutments disposed in and spaced about a 180 degree sector extending about the reference axis. The first and second abutments are disposed on opposite sides of the axis and include corresponding abutment surfaces facing in the same direction disposed in a diametric plane of the reference axis and the adjacent sides of the third abutment and one of the other abutments are disposed in radial planes of the reference axis angularly displaced 45° apart while the opposing surfaces of the third abutment and the other of the first and second abutments are disposed in radial planes of the reference axis angularly displaced 90° apart. Also, a fourth abutment is provided and is spaced generally radially of the reference axis from the third abutment and includes remote side surfaces contained in the same radial planes of the reference axis in which the opposite side surfaces of the third abutment are disposed.

12 Claims, 6 Drawing Figures

PATENTED JAN 15 1974 3,785,057
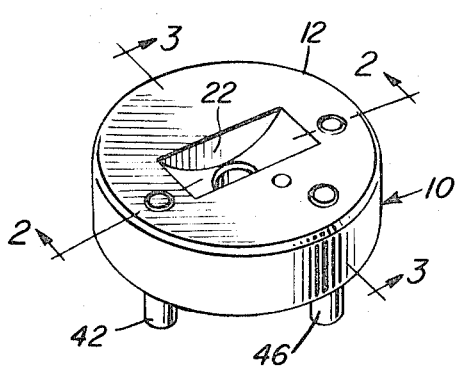
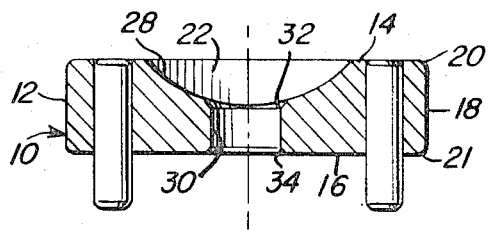
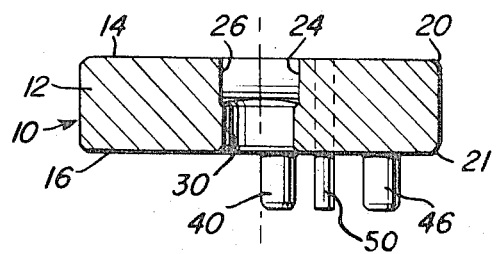
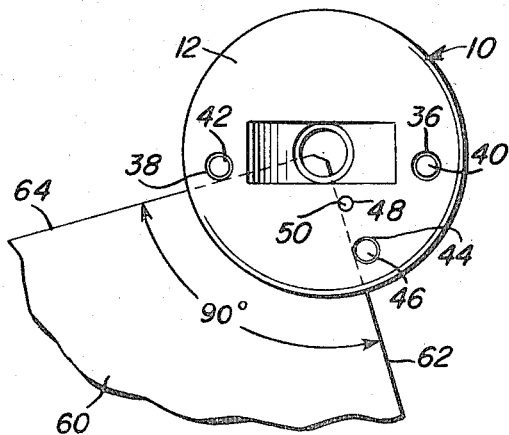
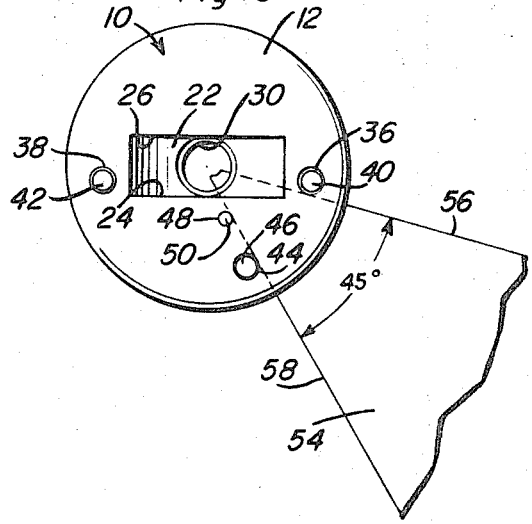
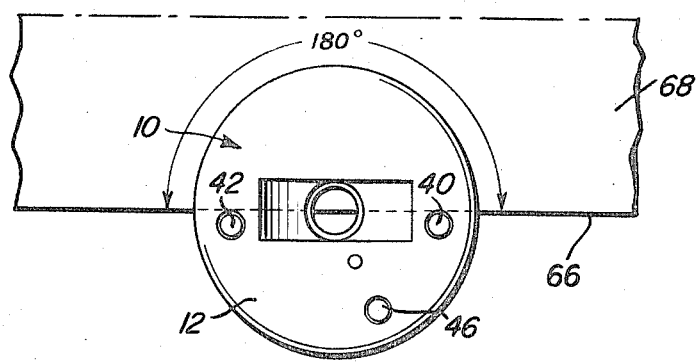
George W. Streander
INVENTOR.
BY Clarence A. O'Brien
and Harvey B. Jacobson
Attorneys

WORKPIECE EDGE AND CORNER LOCATING TOOL

The tool of the instant invention has been specifically designed to provide a means whereby machinists, tool and die makers, mechanics and all persons concerned with the proper alignment of their work may locate a reference edge or surface of a workpiece even if the edge or surface is not well defined. The tool accurately defines included angles of 45° and 90° as well as a straight angle of 180°. In this manner, the apex of a 45° corner as well as the apex of a 90° corner and any point along a straight edge of a workpiece may be located. Of course, if it is desired to utilize the tool in conjunction with angles other than 45° and 90°, the tool may be especially constructed accordingly. However, the tool or gauge illustrated and described hereinafter has been specifically designed to locate the apex edges of 45° and 90° corners on workpieces.

The main object of this invention is to provide a tool whereby any point along a straight line or the apex edge of at least two different angle corners may be precisely located.

Another object of this invention, in accordance with the immediately preceding object, is to provide a tool that may be accurately utilized by even unskilled workmen.

Yet another object of this invention is to provide a tool in accordance with the preceding objects having no moving parts.

A final object of this invention to be specifically enumerated herein is to provide a tool which will conform to conventional forms in manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the tool;

FIG. 2 is an enlarged vertical sectional view taken substantially from the plane indicated by the section line 2—2 of FIG. 1;

FIG. 3 is an enlarged sectional view taken substantially from the plane indicated by the section line 3—3 of FIG. 1;

FIG. 4 is a plan view of the tool in use locating the corner edge of a right angle corner on a workpiece;

FIG. 5 is a plan view of the tool being utilized to locate the corner edge on a 45° corner of a workpiece; and FIG. 6 is a plan view of the tool being used to locate a given point along a straight side or edge of a workpiece.

Referring now more specifically to the drawings, the numeral 10 generally designates the tool of the instant invention which includes a cylindrical disc shaped body 12 having planar upper and lower surfaces 14 and 16. The surfaces 14 and 16 are parallel and the periphery of the body 12 is defined by a continuous cylindrical side surface 18, the upper and lower peripheral edges of the body 12 being chamfered as at 20 and 21.

The body 12 further includes a diametric slot 22 formed in its upper surface including parallel side walls 24 and 26 and a partial cylindrical upwardly opening bottom wall or surface 28. The center of the body 12 is provided with a cylindrical bore 30 whose upper and lower ends are flared as at 32 and 34 and the upper end of the bore 30 opens upwardly into the center of the bottom of the groove 22 while the lower end of the bore 30 opens downwardly through the lower surface 16 of the body 12.

The body 12 has a first pair of bores 36 and 38 formed therein on opposite sides of the bore 30 paralleling the latter and a diametric plane of the center bore 30 extending centrally through the slot or groove 22 is tangent with corresponding sides of the bores 36 and 38, the latter having cylindrical abutment pins 40 and 42 secured therein and projecting from the lower surface 16 of the body 12. In addition, the body 12 has a third bore 44 of the same diameter as the bores 36 and 38 formed therein and an abutment pin 46 is secured in the bore 44 and also projects downwardly from the lower surface 16 of the body 12. Finally, a small diameter bore 48 is formed through the body 12 and has a small abutment pin 50 secured therein. The pins 40, 42, 46 and 50 parallel each other and are cylindrical. Further, the pin 50 also projects downwardly below the lower surface 16 of the body 12 and is positioned between the pin 46 and the bore 30.

With attention now invited more specifically to FIG. 5 of the drawings, it may be seen that a radial plane of the bore 30 tangent to the right-hand sides of the pins 46 and 50 is angularly displaced 45° relative to a radial plane of the bore 30 tangent to the adjacent side of the abutment pin 40. Further, with attention invited more specifically to FIG. 4 of the drawings, it may be seen that a radial plane of the bore 30 tangent to the left-hand sides of the pins 46 and 50 is angularly displaced 90° relative to a radial plane of the bore 30 tangent to the adjacent side of the pin 42.

Finally, with attention invited more specifically to FIG. 6 of the drawings, it may be seen that the upper sides of the pins 40 and 42 are disposed along a diametric plane of the bore 30 extending centrally through and longitudinally of the groove 22.

Accordingly, if it is desired to locate the apex edge of a 45° corner of a workpiece such as the workpiece 54 in FIG. 5, the guage or tool 10 is positioned as illustrated in FIG. 5 with the abutment pin 40 against a first side 56 of the workpiece and the pins 46 and 50 against a second side 58 of the workpiece. With the tool and workpiece 54 thus positioned, the apex edge of the 45° corner of the workpiece 54 defined at the juncture of the sides 56 and 58 will coincide with the center axis of the bore 30. In addition, with attention now invited more specifically to FIG. 4, if the apex edge of a 90° corner of a workpiece 60 defined by the juncture of adjacent sides 62 and 64 of the workpiece 60 is to be located, the tool 10 is positioned relative to the workpiece 60 in the manner illustrated in FIG. 4 of the drawings with the side 62 abutted against the pins 46 and 50 and the side 64 abutted against the pin 42. When thus positioned, the tool 10 will be located relative to the workpiece 60 so that the axis of the bore 30 coincides with the apex edge of the 90° corner defined at the juncture of the sides or surfaces 62 and 64 of the workpiece 60.

With attention now invited more specifically to FIG. 6, if a given location or point of a planar surface 66 of a workpiece such as the workpiece 68 illustrated in FIG. 6 is to be located, the side or surface 66 is abutted against the pins 40 and 42 on the sides thereof remote from the pin 46 and when thus positioned the tool 10 will have the center axis of its bore 30 as well as slot 22 disposed in the plane of the side or surface of the workpiece 68.

The pin 50 is of course provided to properly angularly orient the workpieces 54 and 60 relative to the pins 40 and 46 as well as the center axis of the bore 30 and the pins 42 and 46 as well as the center axis of the bore 30 respectively.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A workpiece edge and corner locating tool comprising a body holding a first surface and including means defining a reference axis, a pair of abutment members projecting outwardly of said surface at points spaced about said axis, adjacent side surfaces of said abutment members lying in radial planes of said axis and angularly disposed relative to each other a predetermined amount, and a third abutment member spaced generally radially of said axis and from one abutment member of said pair of abutment members and including a side surface lying in the radial plane in which the side surface of said one abutment member is disposed and facing in the same direction as the last mentioned side surface, said body including a fourth abutment member projecting outwardly of said first surface at a point spaced about said axis from said one abutment member and disposed on the side thereof remote from the other abutment member of said pair of abutment members, said fourth abutment member including a side surface generally opposing said other and third abutment members lying in a third radial plane of said axis and said other and third abutment members including side surfaces generally opposing said fourth abutment member lying in a fourth radial plane of said axis angularly displaced a predetermined amount relative to said third radial plane.

2. The combination of claim 1 wherein said first and fourth abutment members include side surfaces facing away from said second abutment member lying in a diametric plane of said axis.

3. The combination of claim 2 wherein said third abutment member is spaced from said second abutment member radially inwardly of said axis.

4. The combination of claim 2 wherein said body is cylindrical with its center axis coinciding with said reference axis.

5. The combination of claim 4 wherein said reference axis comprises a longitudinal center axis of a bore formed through said body.

6. The combination of claim 2 wherein said side surfaces of said abutment members comprise partial cylindrical surfaces generated about axes paralleling said reference axis.

7. A workpiece edge and corner locating tool comprising a body having a first surface and including means defining a reference axis, first, second and third abutment members projecting outwardly of said first surface at points spaced from and about said axis and disposed in a 180° sector of said axis, said first and second abutment members including adjacent side surfaces lying in first and second radial planes, respectively, of said axis and said second and third abutment members including adjacent side surfaces lying in third and fourth radial planes, respectively, of said axis and a fourth abutment member projecting outwardly of said first surface in position spaced radially of said axis and from said second abutment member, said fourth abutment member including opposite side surfaces lying in said second and third planes.

8. The combination of claim 7 wherein said first and third abutment members include side surfaces remote from the first mentioned side surfaces thereof lying in a diametric plane of said axis.

9. The combination of claim 7 wherein said reference axis comprises a longitudinal center axis of a bore formed through said body.

10. The combination of claim 9 wherein said body includes a second surface remote from said first surface, said second surface having a groove formed therein disposed on a diametric plane of said reference axis.

11. The combination of claim 10 wherein said first and third abutment members include side surfaces remote from the first mentioned side surfaces thereof lying in a diametric plane of said axis.

12. The combination of claim 11 wherein said diametric planes coincide.

* * * * *